(12) United States Patent
Ghatage et al.

(10) Patent No.: US 10,950,135 B2
(45) Date of Patent: Mar. 16, 2021

(54) CUSTOMIZED VIRTUAL REALITY LEARNING ENVIRONMENT

(71) Applicant: Accenture Global Solutions Limited, Dublin (IE)

(72) Inventors: Prakash Ghatage, Bangalore (IN); Nirav Sampat, Mumbai (IN); Kumar Viswanathan, Bangalore (IN); Vinu Varghese, Bangalore (IN); Santhosh Kumar Rajavelu Balachandar, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 580 days.

(21) Appl. No.: 15/808,392

(22) Filed: Nov. 9, 2017

(65) Prior Publication Data

US 2019/0139430 A1    May 9, 2019

(51) Int. Cl.
*G09B 9/00* (2006.01)
*G09B 5/12* (2006.01)
*G09B 7/02* (2006.01)
*G09B 5/06* (2006.01)
*G06F 40/30* (2020.01)
*G06F 40/58* (2020.01)

(52) U.S. Cl.
CPC .......... *G09B 5/125* (2013.01); *G06F 40/30* (2020.01); *G06F 40/58* (2020.01); *G09B 5/065* (2013.01); *G09B 7/02* (2013.01); *G09B 9/00* (2013.01)

(58) Field of Classification Search
CPC .................................................... G09B 5/125

USPC ......................................................... 434/309
See application file for complete search history.

(56) References Cited

U.S. PATENT DOCUMENTS

| | | | |
|---|---|---|---|
| 2013/0178257 A1* | 7/2013 | Langseth ............ | A63F 13/812 463/4 |
| 2013/0185336 A1* | 7/2013 | Singh .................. | G06F 16/3329 707/794 |
| 2014/0176603 A1 | 6/2014 | Kumar et al. | |
| 2014/0310595 A1 | 10/2014 | Acharya et al. | |
| 2015/0029183 A1 | 1/2015 | Chiu et al. | |
| 2017/0221371 A1 | 8/2017 | Yang | |

\* cited by examiner

*Primary Examiner* — Kesha Frisby
(74) *Attorney, Agent, or Firm* — Harrity & Harrity, LLP

(57) ABSTRACT

A device may receive, from a user device, a request to access a virtual reality (VR) learning environment that includes an identifier associated with a program that supports the VR learning environment. The device may identify a set of objects to use within the VR learning environment by searching a data structure using the identifier associated with the program that supports the VR learning environment. The device may provide the VR learning environment to the user device. The device may receive, from the user device, information associated with interactions within the VR learning environment. The device may identify one or more additional objects to use within the VR learning environment by using one or more natural language processing techniques to analyze the information associated with the interactions within the VR learning environment. The device may provide the one or more additional objects to the user device.

20 Claims, 7 Drawing Sheets

CUSTOMIZED VIRTUAL REALITY LEARNING ENVIRONMENT

BACKGROUND

Virtual reality (VR) may refer to computer technologies that use software to generate realistic images, sounds, and other sensations that replicate a real environment (or create an imaginary setting), and simulate a user's physical presence in the environment. VR may be defined as a realistic and immersive simulation of a three-dimensional environment, created using interactive software and hardware, and experienced or controlled by movement of a user's body. For example, in a VR environment, a person using special electronic equipment, such as a helmet with a display inside, goggles with a display inside, or the like, may interact with a computer-generated simulation of a three-dimensional image or environment in a seemingly real or physical way.

SUMMARY

According to some possible implementations, a device may receive, from a user device, a request to access a virtual reality (VR) learning environment. The request may include an identifier associated with a program that supports the VR learning environment. The device may identify a set of objects to use within the VR learning environment by searching a data structure using at least one of: the identifier associated with the program that supports the VR learning environment or user profile information for a user associated with the user device. The device may provide the VR learning environment that includes the set of objects to the user device. The device may receive, from the user device, information associated with interactions within the VR learning environment. The device may identify one or more additional objects to use within the VR learning environment by using one or more natural language processing techniques to analyze the information associated with the interactions within the VR learning environment. The device may provide the one or more additional objects to the user device. The device may perform, after providing the one or more additional objects to the user device, one or more actions associated with improving the VR learning environment.

According to some possible implementations, a method may include receiving, by a device and from a user device, a request to access a virtual reality (VR) learning environment. The request may include an identifier associated with a program that supports the VR learning environment. The method may include identifying, by the device, a set of objects to use within the VR learning environment by searching a data structure using the identifier associated with the program that supports the VR learning environment. The method may include providing, by the device, the VR learning environment that includes the set of objects to the user device. The method may include receiving, by the device and from the user device, information associated with interactions within the VR learning environment. The method may include identifying, by the device, one or more additional objects to use within the VR learning environment by using one or more natural language processing techniques to analyze the information associated with the interactions within the VR learning environment. The method may include providing, by the device, the one or more additional objects to the user device and in connection with the VR learning environment. The method may include performing, by the device and after providing the one or more additional objects to the user device, one or more actions associated with improving the VR learning environment.

According to some possible implementations, a non-transitory computer-readable medium may store one or more instructions that, when executed by one or more processors, cause the one or more processors to receive, from a user device, a request to access a virtual reality (VR) learning environment. The request may include an identifier associated with a program that supports the VR learning environment. The one or more instructions may cause the one or more processors to identify a set of objects to use within the VR learning environment by searching a data structure using at least one of: the identifier associated with the program that supports the VR learning environment or user profile information for a user associated with the user device. The one or more instructions may cause the one or more processors to provide the VR learning environment that includes the set of objects to the user device. The one or more instructions may cause the one or more processors to receive, from the user device, information associated with interactions within the VR learning environment. The one or more instructions may cause the one or more processors to identify one or more additional objects to use within the VR learning environment by using one or more natural language processing techniques to analyze the information associated with the interactions within the VR learning environment. The one or more instructions may cause the one or more processors to provide the one or more additional objects to the user device.

DETAILED DESCRIPTION

Figure 1A:
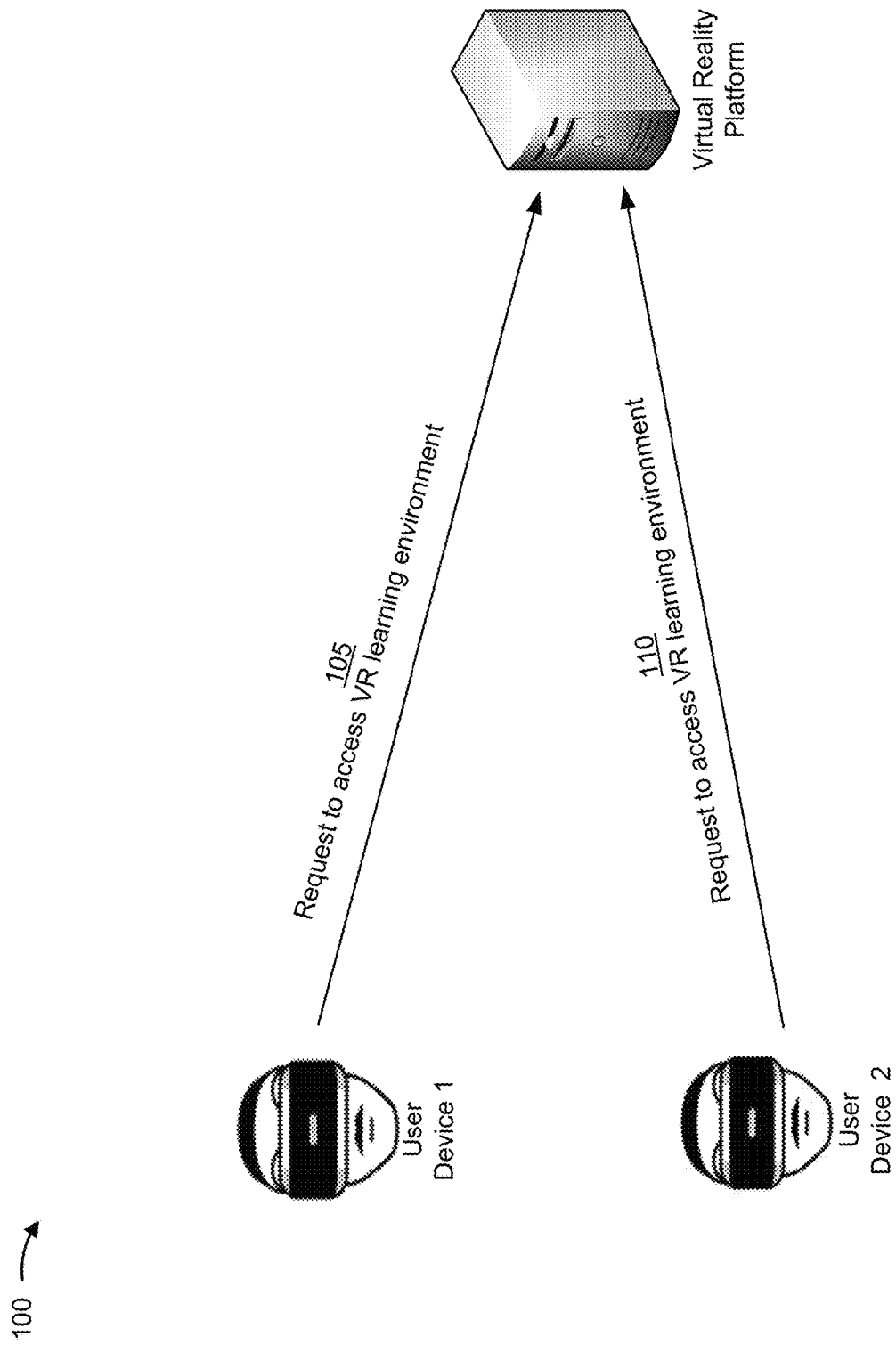
FIGS. 1A-1D are diagrams of an overview of an example implementation described herein.

The following detailed description of example implementations refers to the accompanying drawings. The same reference numbers in different drawings may identify the same or similar elements.

Mastery of a job, a skill, a task, a process, or the like, often requires a continuous process of learning. Within an organization, a training program may be utilized to teach employees how to perform or improve upon particular job responsibilities. For example, an organization may allow new employees to watch a training video to learn how to perform aspects of a job or task.

However, training programs that do not actively engage the user may produce sub-optimal results. For example, a training video may be ineffective if a user loses interest or does not adequately learn from the material presented. Additionally, hands-on training programs may be more effective, but may not always be available if a job or task is associated with a high safety risk (e.g., working with hazardous materials, performing life-threatening surgery on a patient, etc.).

Some implementations described herein permit a VR platform to use one or more natural language processing techniques to analyze user interactions within a VR learning environment, and to provide objects as part of the VR learning environment that are customized to particular users. For example, the VR platform may receive, from a user device, a request to access a VR learning environment. In this case, the VR platform may provide the VR learning environment to the user device to allow a user to access a set of objects associated with the VR learning environment.

Additionally, the VR platform may receive, from the user device, information associated with interactions within the VR learning environment. Furthermore, the VR platform may identify additional objects to provide to the VR learning environment by using natural language processing to analyze the information associated with the interactions within the VR learning environment. In this case, the VR platform may provide the additional objects to the user device, and may perform one or more actions associated with improving the VR learning environment, as described in detail further herein.

By identifying and providing objects that will optimize the user experience, the VR platform conserves processing resources that might otherwise be used to provide objects that are not useful to the user and that will not be used by the user within the VR learning environment. Furthermore, if a user fails a training program supported within the VR learning environment (e.g., by using a VR learning environment that does not utilize objects that are tailored to optimize the user experience), the VR platform conserves processing resources that might otherwise be used to re-run the VR learning environment while the user repeats the training program.

FIGS. 1A-1D are diagrams of an overview of an example implementation 100 described herein. As shown in FIGS. 1A-1D, example implementation 100 may include a VR platform that hosts a VR learning environment, where one or more objects included in the VR learning environment are tailored to preferences of a user accessing a user device (e.g., a VR headset).

As shown in FIG. 1A, and by reference number 105, a first user device (shown as user device 1) may provide a request to access a VR learning environment. For example, the request may include a program identifier (ID) and a user ID. In some implementations, the program ID may represent a particular VR program. For example, the program ID may represent a VR program to perform a surgery, a VR program to teach an employee how to handle hazardous materials, or the like. In some implementations, the user ID may represent an identifier of the user accessing the first user device.

As shown by reference number 110, a second user device (shown as user device 2) may participate in the same VR learning environment. For example, a first user of the first user device and a second user of the second user device could join the same VR learning environment, where the VR learning environment is a virtual classroom created to allow users to learn a particular job, skill, task, and/or the like.

In this way, the VR platform is able to receive requests from one or more users to access a VR learning environment.

Figure 1B:
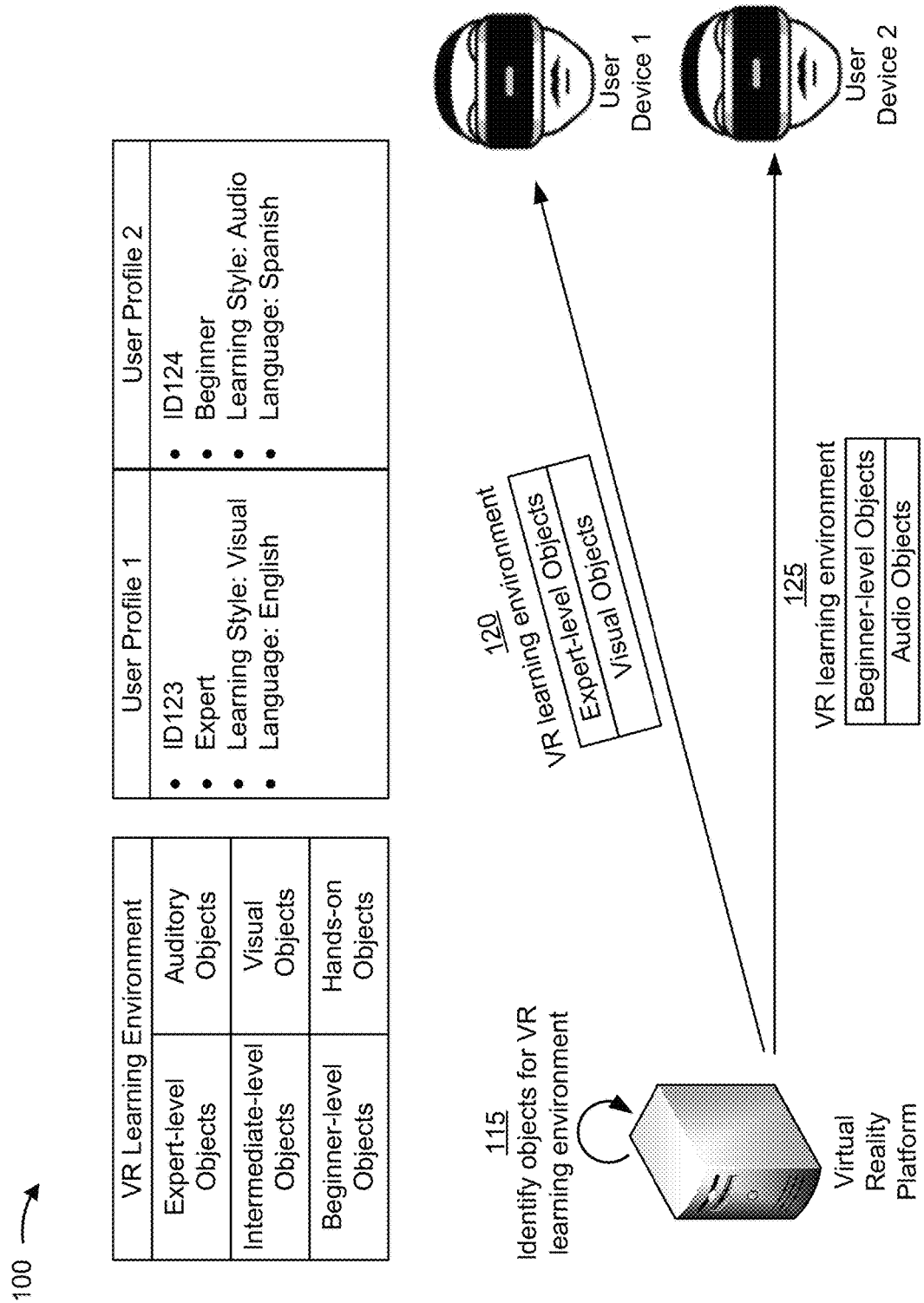

As shown in FIG. 1B, and by reference number 115, the VR platform may identify objects for the VR learning environment. In this case, the first VR platform may identify the objects using the program ID included in the request to look up objects that are stored in association with the program ID. In some implementations, objects for a particular VR program may be segmented by difficulty level (e.g., there can be a group of expert-level objects, a group of intermediate-level objects, by learning style (e.g., there may be objects tailored to an auditory learning style, objects tailored to a visual learning style, objects tailored to a hands-on learning style, etc.), and/or the like. In some implementations, a user profile may store user preferences that relate the user to particular segments (e.g., a user profile may have a preference for a particular skill level, a particular learning style, etc.). This may allow the VR platform to tailor the experience to the first user and to the second user.

As shown by reference number 120, the VR platform may provide, to the first user device, a VR learning environment customized for the first user. For example, the VR platform may provide expert level objects to the first user as the first user is identified as an expert in user profile 1, and may provide visual objects to the first user as the first user is identified as having a preference for visual learning. Additionally, the VR platform may provide English-specific objects to the first user as the first user is identified as having a preferred language of English.

Similarly, as shown by reference number 125, the VR platform may provide, to the second user device, a virtual learning environment customized for the second user. For example, the VR platform may provide beginner level objects to the second user as the second user is identified as a beginner in user profile 2, and may provide objects tailored to auditory learning to the second user as the second user is identified as having a preference for auditory learning. Additionally, the VR platform may provide Spanish-specific objects to the second user as the second user is identified as having a preferred language of Spanish.

In this way, the VR platform may provide the objects identified for the VR learning environment to the first and second user devices, such that the VR learning environment (e.g., a virtual classroom) may be visible through the user devices.

Figure 1C:
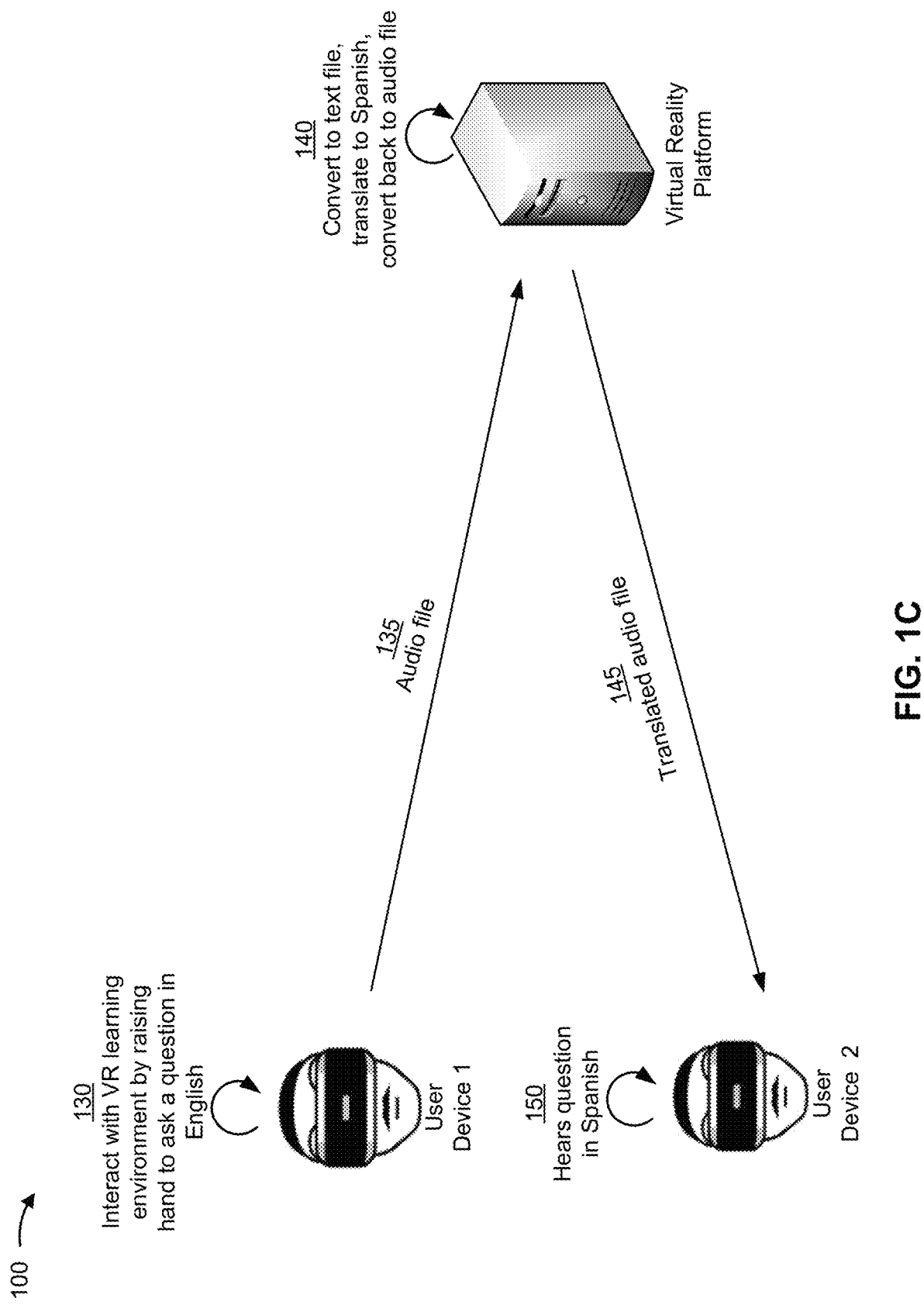

As shown in FIG. 1C, and by reference number 130, the first user (of the first user device) may interact with the VR learning environment by raising his or her hand (e.g., in the virtual classroom) to ask a question in a first language (e.g., shown as English). In this case, the first user device may record the question, and, as shown by reference number 135, may provide an audio file that stores the question to the VR platform.

As shown by reference number 140, the VR platform may convert the audio file to a text file, and may translate the English text to Spanish text, and may convert the Spanish text to an audio file in Spanish. For example, the VR platform may analyze user profile information of one or more users engaged with the VR learning environment to determine that the second user speaks Spanish. In this case, the VR platform may use one or more standardization techniques and/or natural language processing techniques to convert, translate, and re-convert the file that includes the question presented by the first user, as described in detail further herein.

As shown by reference number 145, the VR platform may provide the translated audio file to the second user device. As shown by reference number 150, the second user is able to hear the question presented by the first user in Spanish. Additionally, the second user may, for example, respond to the question in Spanish, and the VR platform may convert the response using a similar process as described above to allow the first user to hear the response in English.

In some implementations, the VR platform may provide objects that depict avatars for each user speaking the same language. For example, if the first user asks a question in English, the VR platform may provide, as part of the VR learning environment for the second user, objects that depict an avatar of the first user asking the question in Spanish (e.g., such that the avatars mouth matches that of a Spanish translation of the English question). Additionally, the VR platform is able to provide the objects in real-time (e.g., relative to receiving and processing the information associated with the interaction), thereby improving performance of the VR learning environment and improving the user experience by making the VR learning environment appear real (i.e., not virtual).

In this way, users within the VR learning environment that speak different languages are able to collaborate and aid each other in the learning process.

Figure 1D:
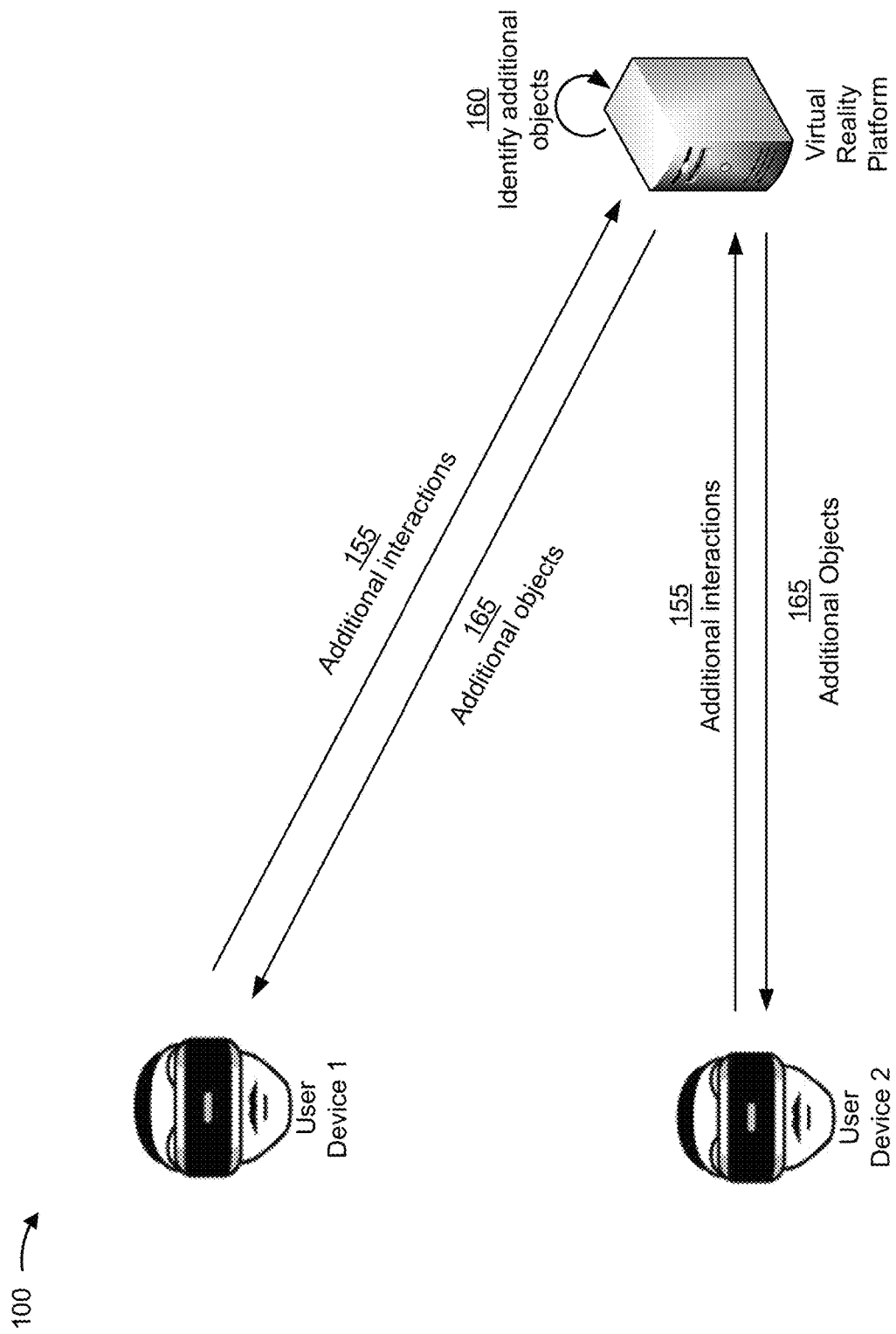

As shown in FIG. 1D, and by reference number 155, while the first user and the second user engage with the VR learning environment, the users may perform a number of different additional interactions, such as additional interactions between a user and objects (e.g., selecting a menu option from a virtual menu, carrying a virtual object (e.g., to simulate carrying hazardous materials), interacting with a virtual object (e.g., to simulate performing an action in a surgery)), additional interactions between users (e.g., collaborative learning, interactions with a professor who is teaching within the VR learning environment, interactions among users participating within the VR learning environment, etc.), and/or the like.

As shown by reference number 160, the VR platform may identify a set of additional objects. For example, the VR platform may identify a set of additional objects by using one or more natural language processing techniques to analyze the additional interactions. In this case, the VR platform may analyze the additional interactions to identify subject areas where a user is excelling, struggling, etc., and may look up additional objects to supplement the VR learning environment to improve the user experience. Additionally, the VR platform may receive interactions of a number of different data types (e.g., a text file, an audio file, a media file, etc.), and may selectively identify and execute a natural language processing technique based on a particular data type, as described further herein.

Additionally, or alternatively, the first user and/or the second user may provide feedback information, and the VR platform may analyze the feedback information to identify the additional objects. Additionally, or alternatively, the VR platform may analyze the feedback information and/or the additional interactions to identify user preferences. In this case, the VR platform can update the user profile with the user preferences, thereby ensuring that the first user and the second user are able to receive a tailored virtual learning experience.

By providing the first user device and the second user device with objects that are tailored to user preferences, the VR platform conserves processing resources that might otherwise be used to provide objects that are not useful to the user and that may not be used by the user within the VR learning environment.

As indicated above, FIGS. 1A-1D are provided merely as an example. Other examples are possible and may differ from what was described with regard to FIGS. 1A-1D. For example, while implementations described herein describe a VR learning environment, in other implementations, an augmented learning environment may be implemented that utilizes augmented reality (AR) technology. Additionally, in some implementations, a learning environment may be utilized that uses both VR technology and AR technology.

Figure 2:
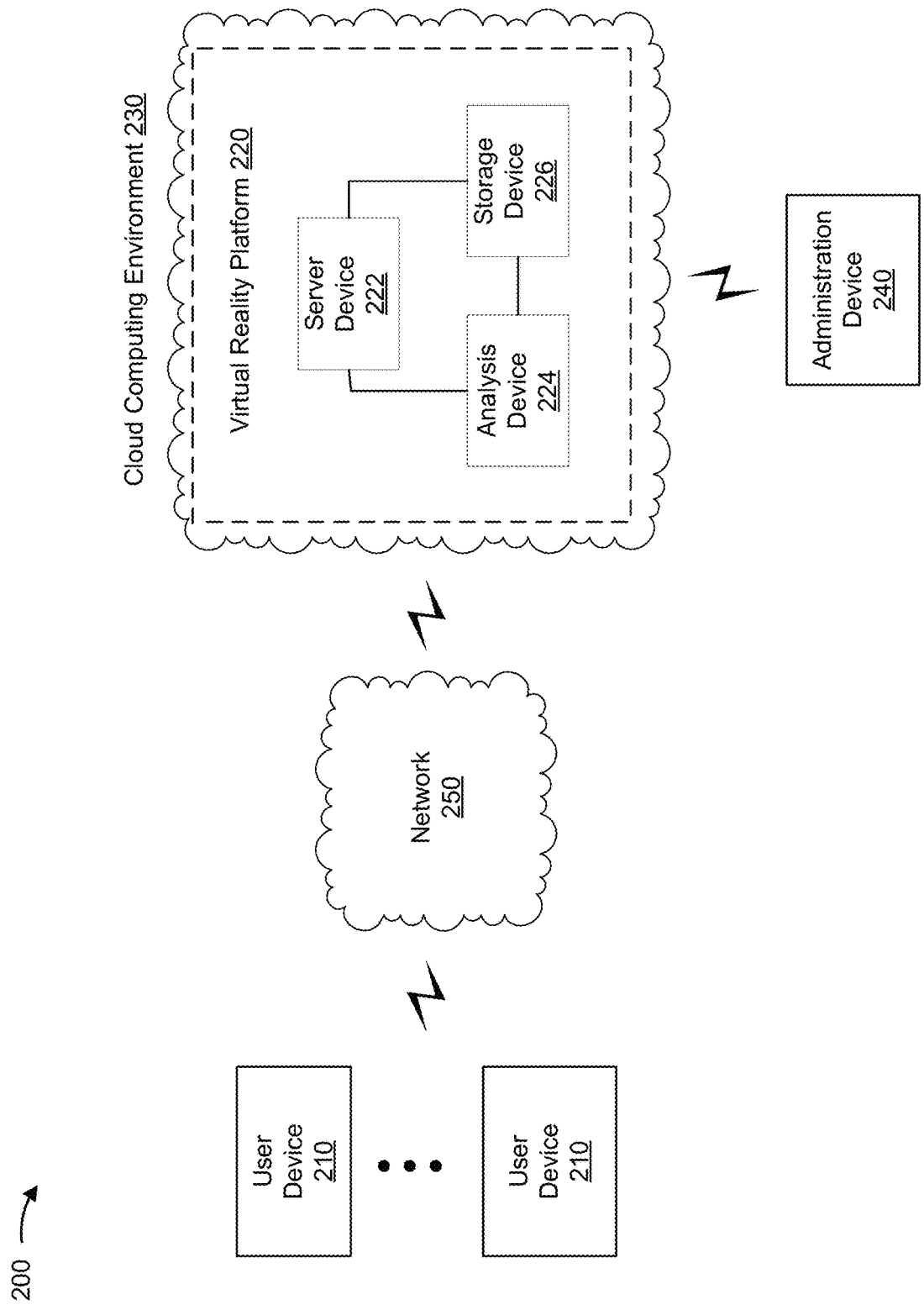
FIG. 2 is a diagram of an example environment in which systems and/or methods, described herein, may be implemented.

FIG. 2 is a diagram of an example environment in which systems and/or methods, described herein, may be implemented. As shown in FIG. 2, environment 200 may include one or more user device(s) 210, VR platform 220 hosted in a cloud computing environment 230, an administration device 240, and/or a network 250. Devices of environment 200 may interconnect via wired connections, wireless connections, or a combination of wired and wireless connections.

User device 210 includes one or more devices capable of receiving, generating, storing, processing, and/or providing information associated with a VR learning environment. For example, user device 210 may include a communication and computing device, such as a mobile phone (e.g., a smart phone, a radiotelephone, etc.), a laptop computer, a tablet computer, a handheld computer, a wearable communication device (e.g., a virtual reality headset, a pair of smart eyeglasses, etc.), a virtual reality device, or a similar type of device. User device 210 may generate and/or provide at least a portion of a VR environment that is generated and/or modified by VR platform 220.

In some implementations, user device 210 may interact with one or more devices in a vicinity around user device 210, such as a phone, a controller (e.g., a joystick), a speaker, a headphone, a mouse, a keyboard, a printer, a monitor, a webcam, a microphone, or a similar type of device. In some implementations, user device 210 may provide a request to access a VR learning environment to VR platform 220, which may cause VR platform 220 to provide the VR learning environment to user device 210. In some implementations, user device 210 may provide information associated with one or more interactions within the VR learning environment to VR platform 220.

VR platform 220 includes one or more devices capable of receiving, determining, processing, storing, and/or providing information associated with a VR learning environment. For example, VR platform 220 may include a server device (e.g., a host server, a web server, an application server, etc.), a cloud device, a data center device, or a similar device. In some implementations, VR platform 220 may be associated with a VR program that includes a learning environment (e.g., an environment in which a user may learn a skill, a task, a job, etc.). The VR program may be a computer program designed to perform a group of coordinated functions, tasks, or activities for the VR platform 220. For example, the VR program may integrate VR platform 220 with a graphical user interface (GUI) of VR platform 220. In some implementations, the VR program may be installed on user device 210.

In some implementations, VR platform 220 may be associated with a GUI. The GUI may allow a user to interact with user device 210 through graphical icons, visual indicators, typed command labels, text navigation, or the like. A user may interact with the GUI through direct manipulation of the graphical icons, visual indicators, typed command labels, text navigation, or the like.

In some implementations, VR platform 220 may be associated with one or more operating systems (e.g., iOS, Android, or the like). In some implementations, VR platform 220 may be associated with application middleware. The application middleware may be a software layer that ties the one or more operating systems and the VR application. The application middleware also may connect software components in VR platform 220. In some implementations, VR platform 220 may be associated with an application programming interface (API) that defines how routines and protocols may be used when the GUI is programmed.

In some implementations, as shown, VR platform 220 may be hosted in cloud computing environment 230. Notably, while implementations described herein describe VR platform 220 as being hosted in cloud computing environment 230, in some implementations, VR platform 220 may not be cloud-based or may be partially cloud-based.

As further shown in FIG. 2, VR platform 220 may include a server device 222, an analysis device 224, and/or a storage device 226. In some implementations, server device 222, analysis device 224, and/or storage device 226 may communicate via wired connections, wireless connections, or a combination of wired and wireless connections.

Server device 222 includes one or more devices capable of receiving, collecting, obtaining, gathering, storing, processing, and/or providing information associated with a VR learning environment. For example, server device 222 may include a server device or a group of server devices. In some implementations, server device 222 may be implemented by one or more virtual machines executing on one or more computer devices of cloud computing environment 230. In some implementations, server device 222 may receive a request to access a VR learning environment from user device 210 (e.g., via an API). In some implementations, server device 222 may receive information associated with an interaction within the VR learning environment. In some implementations, server device 222 may provide the information associated with the interaction within the VR learning environment to analysis device 224.

Analysis device 224 includes one or more devices capable of receiving, collecting, obtaining, gathering, storing, processing, and/or providing information associated with a VR learning environment. For example, analysis device 224 may include a server device or a group of server devices. In some implementations, server device 222 may be implemented by one or more virtual machines executing on one or more computer devices of cloud computing environment 230. In some implementations, analysis device 224 may analyze the information associated with the interactions within the VR learning environment using one or more natural language processing techniques. In some implementations, analysis device 224 may provide the information associated with the interactions within the VR learning environment, objects or additional objects identified from analyzing the information, and/or the like, to storage device 226.

Storage device 226 includes one or more devices capable of receiving, collecting, obtaining, gathering, storing, processing, and/or providing information associated with a VR learning environment. For example, storage device 226 may include a server device or a group of server devices. In some implementations, server device 222 may be implemented by one or more virtual storage devices of cloud computing environment 230. In some implementations, storage device 226 may store information associated with interactions within the VR learning environment, user profile information, feedback information, and/or the like. In some implementations, storage device 226 may store content updates provided by a VR platform 220 administrator. For example, storage device 2260 may store content updates that are pushed onto VR platform 220 by administration device 240.

Administration device 240 includes one or more devices capable of receiving, generating, storing, processing, or providing information associated with a VR learning environment. For example, administration device 240 may include a server device, a group of server devices, one or more of the devices associated with user device 210, and/or the like. In some implementations, administration device 240 may manage push notifications for user device 210 based on updates or changes to a VR learning environment.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
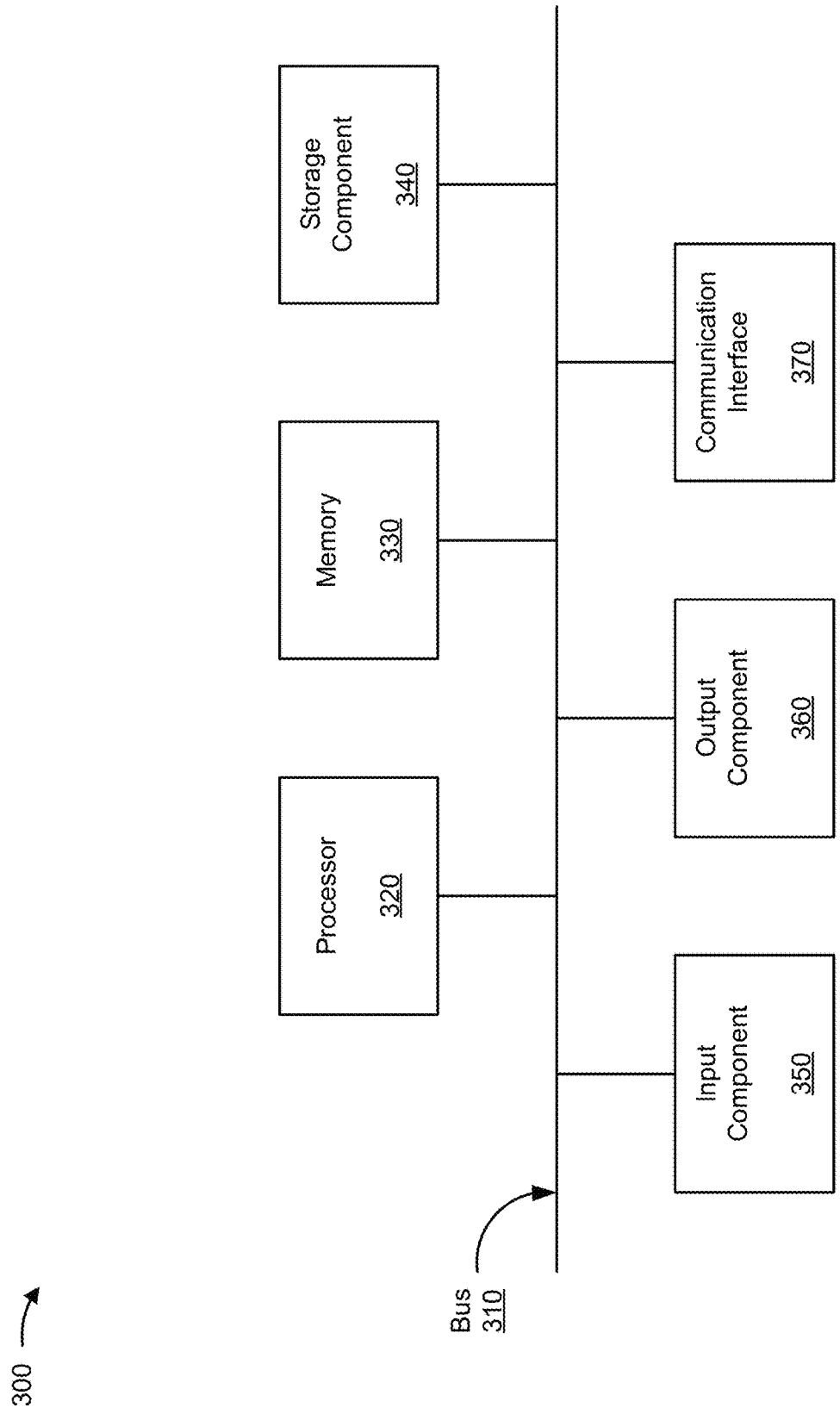
FIG. 3 is a diagram of example components of one or more devices of FIG. 2.

FIG. 3 is a diagram of example components of a device 300. Device 300 may correspond to user device 210, VR platform 220, server device 222, analysis device 224, storage device 226, and/or administration device 240. In some implementations, user device 210, VR platform 220, server device 222, analysis device 224, storage device 226, and/or administration device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
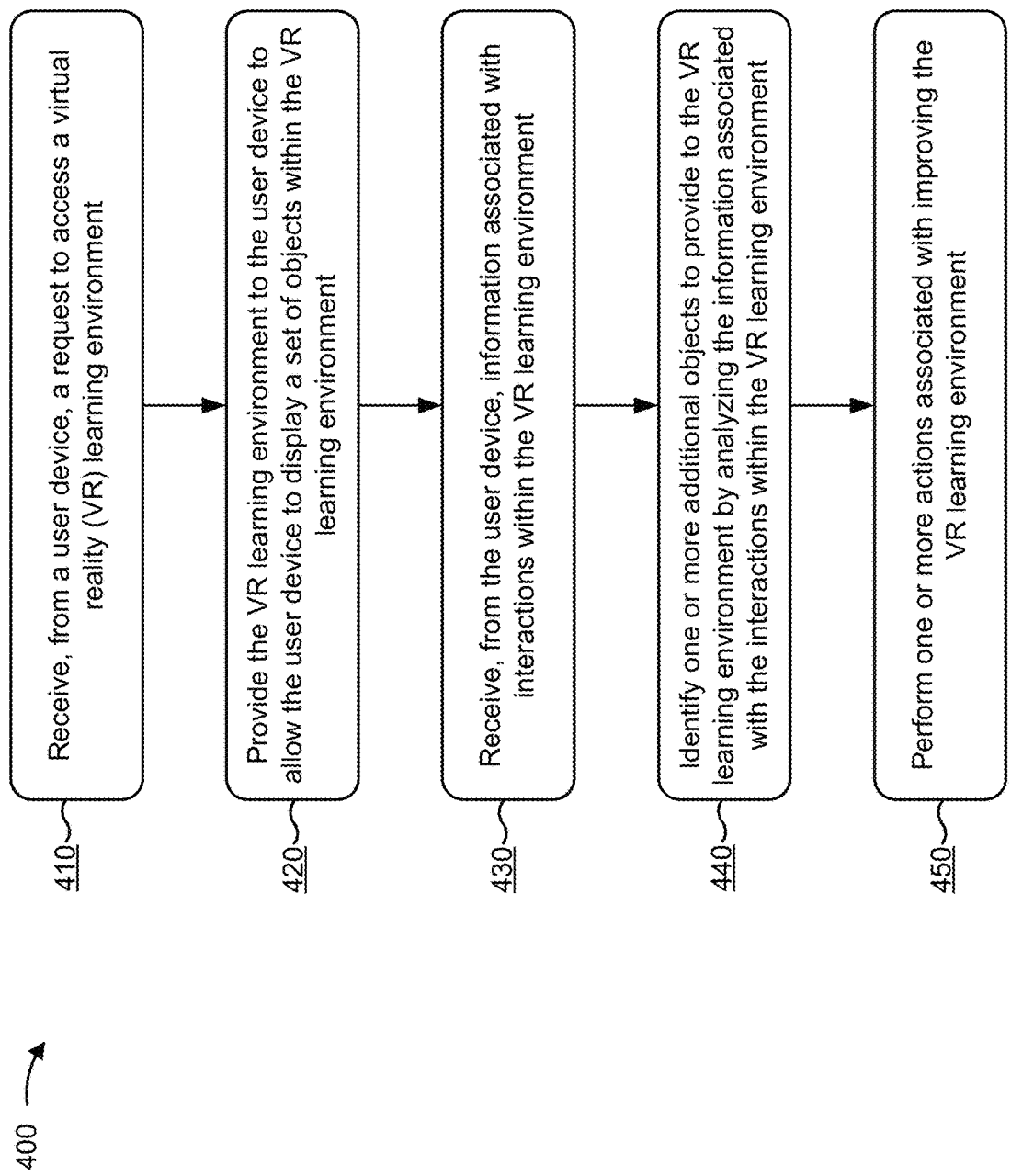
FIG. 4 is a flow chart of an example process for using one or more natural language processing techniques to provide a user device with objects to use within a VR learning environment.

FIG. 4 is a flow chart of an example process 400 for using one or more natural language processing techniques to provide a user device with objects to use within a VR learning environment. In some implementations, one or more process blocks of FIG. 4 may be performed by VR platform 220. In some implementations, one or more process blocks of FIG. 4 may be performed by another device or a group of devices separate from or including VR platform 220, such as user device 210 and/or administration device 240.

As shown in FIG. 4, process 400 may include receiving, from a user device, a request to access a virtual reality (VR) learning environment (block 410). For example, VR platform 220 may receive, from user device 210 (e.g., a virtual reality device), a request to access a VR learning environment. The VR learning environment may be a virtual environment that allows users to learn a job, a skill, a task, a process, a procedure, and/or the like. In some cases, the VR learning environment may be associated with a job, skill, task, process, procedure, or the like, that involves a high degree of safety risk (e.g., learning how to operate with or around hazardous materials, perform life-threatening surgery, fly an aircraft, skydive, operate machinery, etc.).

In some implementations, user device 210 may obtain a VR program that supports a VR learning environment. For example, user device 210 may obtain the VR program by downloading the VR program from a web service (e.g., an app store). In this case, VR platform 220 and/or user device 210 may install the VR program on user device 210.

In some implementations, user device 210 may create a user profile associated with the VR program. For example, a user of user device 210 may create a profile such that the user may be registered to participate in the VR learning environment. In this case, creating a profile may include the user inputting user profile information, credential information (e.g., a username, a password, etc.), user preferences (e.g., a preferred learning style, a preferred level of difficulty for tasks which can be based on user experience, etc.), and/or the like.

In some implementations, VR platform 220 may receive a request to access the VR learning environment. For example, user device 210 may launch a VR program which may cause a request to use the VR program to be sent to VR platform 220. In this case, the request may include an identifier associated with the VR program and/or user profile information associated with the user who is accessing user device 210.

In this way, VR platform 220 is able to receive a request to access a VR learning environment.

As further shown in FIG. 4, process 400 may include providing the VR learning environment to the user device to allow the user device to display a set of objects within the VR learning environment (block 420). For example, VR platform 220 may provide the VR learning environment to user device 210 to allow a user to access user device 210 to interact with a set of objects included in the VR learning environment. The set of objects may include an animation, a two-dimensional (2D) object, a three-dimensional (3D) object, an interactive set of information, an audio recording, a guide, and/or any other information that may be provided as part of the VR learning environment. In some cases, an object may correspond to a physical object in the surroundings of user device 210.

In some implementations, VR platform 220 may identify a set of objects to be provided as part of the VR learning environment. For example, the request from user device 210 may include an identifier for a VR learning environment, and VR platform 220 may use the identifier for the VR learning environment to look up a set of objects that are stored in association with the VR learning environment. In this case, VR platform 220 may store one or more sets of objects associated with one or more VR learning environments, and may associate objects with a particular VR learning environment based on the identifier for the VR learning environment.

In some implementations, VR platform 220 may identify a set of objects to be provided as part of the VR learning environment based on user profile information. For example, the user profile information may include information indicating past VR learning environments that the user has interacted with, information indicating a preferred user learning style, information indicating a level of user experience in a particular subject matter, and/or the like. In this case, VR platform 220 may analyze the user profile information (e.g., using one or more natural language processing techniques, etc.) to identify one or more user preferences, and may use the one or more user preferences to search a data structure for objects that relate to the one or more user preferences.

As an example, assume user profile information includes information identifying a level of expertise that the user has in the subject matter to which the VR learning environment relates. In this case, VR platform 220 may select objects relating to the particular degree of experience of the user. For example, VR platform 220 may select from beginner-level objects, intermediate-level objects, expert-level objects, and/or the like.

As another example, assume user profile information includes information indicating one or more preferred learning styles. In this case, VR platform 220 may select objects relating to the particular learning style of the user. For example, VR platform 220 may select from objects explaining subject matter using audio, using visualizations, using hands-on exercises, using any combination of the preceding, and/or the like. In some cases, the information indicating the one or more preferred learning styles may be input by a user when the user creates the user profile information. Alternatively, the information indicating the learning styles may be determined by VR platform 220 based on prior user interactions with virtual environments (e.g., historical user interactions can be stored, and used to identify user preferences).

In some implementations, VR platform 220 may provide the VR learning environment to user device 210. For example, VR platform 220 may provide the set of objects to user device 210, such that a user may access user device 210 to interact with the VR learning environment.

Additionally, if the VR learning environment is available to a group of users, VR platform 220 may provide the VR learning environment to a group of user devices (e.g., such that the group of users may collectively interact with the VR learning environment). In this case, each user may be able to perceive a different (i.e., personalized) experience, such that some objects may be identical, some objects may be different, some objects may be translated to an appropriate language, some objects may only appear to particular users, and/or the like.

In this way, VR platform 220 is able to provide the VR learning environment to user device 210.

As further shown in FIG. 4, process 400 may include may include receiving, from the user device, information associated with interactions within the VR learning environment (block 430). For example, VR platform 220 may receive, from user device 210, interactions between the user (accessing user device 210) and objects within the VR learning environment, interactions between the user and other users that are accessing the VR learning environment, and/or the like. In this case, as the user interacts with objects within the VR learning environment and/or other users within the VR learning environment, user device 210 can provide information associated with the interactions to VR platform 220 (e.g., via an API).

In some implementations, VR platform 220 may receive information associated with interactions within the VR learning environment. For example, VR platform 220 may receive the information in the form of an audio file, a text file, a video file, and/or the like. In this way, VR platform 220 is able to receive information of different data types, depending on the particular type of interaction made within the VR learning environment.

As an example, VR platform 220 may receive information associated with interactions within an immersive classroom experience. For example, a set of users may engage in a classroom-style learning experience. In this case, users may provide questions, receive answers from other users, engage in hands-on learning by accessing 3D objects, collaborate with other users, and/or the like. In some implementations, a first user of the VR learning environment may be able to see and interact with a virtual representation of a second user of the VR learning environment. In some implementations, the VR learning environment may provide a 4D experience by permitting users to sense (e.g., using an effect outside what is typical for a 3D experience) something physical outside of what the users can see and hear.

In some implementations, VR platform 220 may receive information associated with interactions between the user accessing user device 210 and objects within the VR learning environment. For example, the user may interact with virtual objects to ask or respond to a question, may physically move a virtual object (e.g., to simulate carrying hazardous materials), may select an object (e.g., from a menu of possible objects), and/or the like.

In some cases, the interactions may be with a virtual interface or object that is not associated with something in the physical world (e.g., a projected image of a menu where a user may select an option from the menu). In other cases, the interactions may be with a physical object, where the physical object is associated with one or more virtual objects in the VR learning environment.

Additionally, or alternatively, VR platform 220 may receive information associated with interactions between the user accessing user device 210 and other users within the VR learning environment. For example, the user may interact with other users in a virtual classroom, may interact with a professor or a teacher that manages the virtual classroom, or the like. Additionally, users may speak different languages but, as described in further detail herein, may interact with each other based on VR platform 220 automatically translating interactions, such that the translated version of the interactions is what each user hears.

In this way, VR platform 220 is able to receive information associated with interactions within the VR learning environment.

As further shown in FIG. 4, process 400 may include identifying one or more additional objects to provide to the VR learning environment by analyzing the information associated with the interactions within the VR learning environment (block 440). For example, VR platform 220 may identify one or more additional objects to provide to the VR learning environment by using one or more natural language processing techniques to analyze the information associated with the interactions within the VR learning environment.

In some implementations, VR platform 220 may analyze the information associated with the interactions within the VR learning environment using a natural language processing technique. For example, VR platform 220 may process the information using syntax-based natural language processing (e.g., lemmatization, stemming, part-of-speech tagging, parsing, etc.), semantic-based natural language processing (e.g., lexical semantics, machine translation, optical character recognition (OCR), etc.), sentiment analysis, speech-based natural language processing (e.g., speech recognition, speech segmentation, etc.), and/or the like.

In some implementations, VR platform 220 may selectively identify a natural language processing technique to apply to the information associated with the interactions within the VR learning environment. For example, the information received can be of different data types (e.g., a text file, an audio file, a media file, etc.), and VR platform 220 may selectively identify an appropriate natural language processing technique, of a plurality of possible natural language processing techniques, to apply to the information based on a data type of the information received. By using an appropriate natural language processing technique, VR platform 220 conserves processing resources and improves operation of VR platform 220 relative to using an inappropriate natural language processing technique.

In some implementations, VR platform 220 may standardize the information associated with the interactions within the VR learning environment. For example, VR platform 220 may receive information associated with different data types, data formats, and/or the like, and may standardize the information to a uniform data type, data format, and/or the like. In some implementations, VR platform 220 may apply different standardization techniques for different data types or data formats. By using an appropriate standardization technique for a particular data type or data format, VR platform 220 may conserve processing resources relative to using an inappropriate standardization technique.

In some implementations, VR platform 220 may convert information associated with the interactions within the VR learning environment from a first data type to a second data type. For example, VR platform 220 may receive information of a first data type (e.g., an audio file), and may convert the information of the first data type to information of a second type (e.g., a text file). In this way, VR platform 220 is able to convert information to a format that is capable of being further processed by a natural language processing technique.

In some implementations, VR platform 220 may translate the information associated with the interactions within the VR learning environment to another language. For example, VR platform 220 may store a set of dictionaries for different languages, and may perform a translation technique that accesses one or more of the dictionaries to translate the information to another language. Additionally, VR platform 220 may analyze user profile information associated with one or more users interacting within the VR learning environment to determine whether users that speak different languages are using the same VR learning environment. If so, VR platform 220 may translate the information to languages spoken by the one or more users. Additionally, VR platform 220 may provide the translated version of the information to devices associated with the one or more users, such that the one or more users are able to hear the information in a native language (or in a preferred language indicated by the user profiles).

In some implementations, VR platform 220 may identify one or more additional objects to provide to the VR learning environment by parsing additional materials associated with the VR learning environment. For example, assume the user asks a question within the VR learning environment, which causes a file of a first data type to be provided to VR platform 220. In this case, VR platform 220 may convert the file of the first data type to a file of a second data type. Additionally, VR platform 220 may process the file of the second data type using one or more natural language processing techniques. Furthermore, VR platform 220 may use the processed file to search a document that includes historical data associated with frequently asked questions (FAQ) of users to identify a response to the question presented by the user. In this way, VR platform 220 may provide the identified response to the question as one or more additional objects to deploy within the VR learning environment.

In some implementations, VR platform 220 may identify one or more additional objects to provide to the VR learning environment by performing a scoring analysis technique. For example, VR platform 220 may use a scoring analysis technique (e.g., a sentiment analysis technique, a semantic analysis technique, etc.) to determine whether the user is happy, sad, angry, optimistic, pessimistic, and/or the like. In this case, VR platform 220 may identify one or more additional objects based on a score associated with the user. As an example, if a user is unhappy, VR platform 220 may identify one or more additional objects of a different learning style, of a different level of difficulty, and/or the like. In this way, VR platform 220 is able to use natural language processing to provide additional objects needed to improve the user experience.

Additionally, or alternatively, user device 210 may be configured to analyze facial expressions of the user, and may provide information associated with the facial expressions to VR platform 220. In this case, VR platform 220 may perform a scoring analysis on the facial expressions, and may provide one or more additional objects based on a score associated with the user.

In some implementations, VR platform 220 may provide the one or more additional objects to the VR learning environment. For example, VR platform 220 may provide the one or more additional objects such that users may interact with the one or more additional objects in real-time.

In this way, VR platform 220 is able to use natural language processing to identify one or more additional objects to provide to the VR learning environment.

As further shown in FIG. 4, process 400 may include performing one or more actions associated with improving the VR learning environment (block 450). For example, VR platform 220 may receive and analyze feedback information, add or update user profile information with user preferences, provide recommendations for additional VR learning environments, and/or the like.

In some implementations, VR platform 220 may receive feedback information from user device 210. For example, feedback information may include information associated with user performance (e.g., feedback relating to how well the user performed while interacting with the VR learning environment, feedback relating to what the user did within the VR learning environment, etc.), information indicating specific user feedback (e.g., a user may provide feedback regarding quality of the experience, positive aspects, negative aspects, etc.), and/or the like. In this case, VR platform 220 may use the feedback information to update or adjust objects associated with the VR learning environment, update user preferences included in the user profile information, and/or the like.

As an example, if the user provides feedback indicating that visualizations within the VR learning environment were not helpful, VR platform 220 may flag the objects associated with the visualizations so that a human developer may replace the objects, may automatically replace the objects associated with the visualizations, may update the user preferences of the user profile information such that the user receives different objects the next time that the user uses the VR learning environment, and/or the like. In this way, VR platform 220 is able to receive and utilize feedback relating to user performance and a user opinion to improve the quality of the VR learning environment.

In some implementations, VR platform 220 may use feedback information from a first user to modify an experience of a second user. For example, VR platform 220 may receive feedback information from a first user. In this case, VR platform 220 may analyze the feedback information of the first user and user profile information of the second user to determine that the feedback may help to improve an experience of the second user. Here, VR platform 220 may provide additional objects to the second user based on analyzing the feedback information of the first user.

Additionally, or alternatively, VR platform 220 may add or update user profile information with user preferences. For example, VR platform 220 may analyze the information associated with the interactions within the VR learning environment to identify user preferences that may be added to the user profile information. In this way, the updated user preferences may be used to provide a more-tailored experience the next time that the user engages in a VR learning environment.

Additionally, or alternatively, VR platform 220 may provide a recommendation for an additional VR learning environment. For example, VR platform 220 may analyze the user profile information, identify one or more user preferences, and provide a recommendation for an additional VR learning environment. In this case, VR platform 220 may compare the one or more user preferences to a set of objects associated with additional VR learning environments. Additionally, VR platform 220 may select a VR learning environment with objects that satisfy a threshold level of similarity with the one or more user preferences. Additionally, VR platform 220 may provide the recommendation to user device 210.

In this way, VR platform 220 is able to perform one or more actions associated with improving the VR learning environment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By identifying objects that will optimize the user experience, VR platform 220 conserves processing resources that might otherwise be used to provide objects that are not useful to the user and that will not be used by the user within the VR learning environment. Furthermore, if a user fails a training program supported within the VR learning environment (e.g., by using a VR learning environment that does not utilize objects that are tailored to optimize the user experience), VR platform 220 conserves processing resources that might otherwise be used to re-run the VR learning environment while the user repeats the training program.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more processors to:
 receive, from a user device, a request to access a virtual reality (VR) learning environment,
  the request including an identifier associated with a program that supports the VR learning environment;
 identify a set of objects to use within the VR learning environment by searching a data structure using at least one of:
  the identifier associated with the program that supports the VR learning environment, or
  user profile information for a user associated with the user device;
 provide the VR learning environment that includes the set of objects to the user device;
 receive, from the user device, information associated with interactions within the VR learning environment;
 identify one or more additional objects to use within the VR learning environment by using one or more natural language processing techniques to analyze the information associated with the interactions within the VR learning environment;
 provide, to the user device, data that causes the one or more additional objects to be deployed in the VR learning environment; and
 perform, after providing the one or more additional objects to the user device, one or more actions associated with improving the VR learning environment.
2. The device of claim 1, where the one or more processors, when identifying the set of objects to use within the VR learning environment, are to:

identify one or more user preferences from the user profile information, and search the data structure using the identifier associated with the program that supports the VR learning environment and the one or more user preferences, the one or more user preferences including at least one of:

information indicating past VR learning environments that the user has interacted with, information indicating a preferred user learning style, or information indicating a level of user experience in particular subject matter.

3. The device of claim 1, where the one or more processors, when receiving the information associated with the interactions within the VR learning environment, are to:

receive:

information associated with a first data type, information associated with a second data type, and information associated with a third data type; and where the one or more processors, when identifying the one or more additional objects to use within the VR learning environment, are to:

analyze the information associated with the first data type, the information associated with the second data type, and the information associated with the third data type using the one or more natural language processing techniques, and identify the one or more additional objects to use within the VR learning environment based on a result of the one or more natural language processing techniques.

4. The device of claim 1, where the one or more processors, when receiving the information associated with the interactions within the VR learning environment, are to:

receive information associated with a first language;

where the one or more processors, when identifying the one or more additional objects to use within the VR learning environment, are to:

translate the information associated with the first language to information associated with a second language; and where the one or more processors, when providing the data that causes the one or more additional objects to be deployed in the VR learning environment, are to:

provide the information associated with the second language to be deployed in the VR learning environment.

5. The device of claim 1, where the one or more processors, when receiving the information associated with the interactions within the VR learning environment, are to:

receive information of a first data type, the information being associated with a question presented by the user; and where the one or more processors, when identifying the one or more additional objects to the use within the VR learning environment, are to:

convert the information of the first data type to information of a second data type, analyze the information of the second data type using the one or more natural language processing techniques, and use the analyzed information of the second data type to search a document that includes historical data associated with frequently asked questions of users to identify the one or more additional objects to use within the VR learning environment, the one or more additional objects being associated with responses to the question presented by the user.

6. The device of claim 1, where the one or more processors, when performing the one or more actions, are to:

update the user profile information with one or more user preferences based on the one or more additional objects identified with the one or more natural language processing techniques;

where the one or more processors are further to:

receive a request to access another VR learning environment;

identify another set of objects to use within the other VR learning environment by searching the data structure that includes the updated user profile information; and provide the other VR learning environment that includes the other set of objects to the user device.

7. The device of claim 1, where the one or more processors, when performing the one or more actions, are to:

receive feedback information from the user device, the feedback information including at least one of:

information associated with user performance, or information associated with a user opinion of the VR learning environment, update the user profile information with one or more user preferences based on the feedback information, and provide, to the user device, additional data that causes one or more objects associated with the one or more user preferences to be deployed in the VR learning environment.

8. A method, comprising:

receiving, by a device and from a user device, a request to access a virtual reality (VR) learning environment, the request including an identifier associated with a program that supports the VR learning environment;

identifying, by the device, a set of objects to use within the VR learning environment by searching a data structure using the identifier associated with the program that supports the VR learning environment;

providing, by the device, the VR learning environment that includes the set of objects to the user device;

receiving, by the device and from the user device, information associated with interactions within the VR learning environment;

identifying, by the device, one or more additional objects to use within the VR learning environment by using one or more natural language processing techniques to analyze the information associated with the interactions within the VR learning environment;

providing, by the device and to the user device, data that causes the one or more additional objects to be deployed in the VR learning environment; and performing, by the device and after providing the one or more additional objects to the user device, one or more actions associated with improving the VR learning environment.

9. The method of claim 8, where identifying the set of objects to use within the VR learning environment comprises:

searching the data structure, using the identifier associated with the program that supports the VR learning environment and user profile information for a user associated with the user device, to identify the set of objects.

10. The method of claim 8, where identifying the one or more additional objects to use comprises:

analyzing the information associated with the interactions within the VR learning environment to identify a data type,
identifying a natural language processing technique, of a plurality of natural language processing techniques, based on the data type, and
using the identified natural language processing technique to identify the one or more additional objects to use within the VR learning environment.

11. The method of claim 8, where receiving the information associated with the interactions within the VR learning environment comprises:
receiving information of a first data type;
where identifying the one or more additional objects to use within the VR learning environment comprises:
converting the information of the first data type to information of a second data type; and
where providing the data that causes the one or more additional objects to be deployed in the VR learning environment comprises:
providing the information of the second data type to be deployed in the VR learning environment.

12. The method of claim 8, where identifying the one or more additional objects to use within the VR learning environment comprises:
analyzing the information associated with the interactions within the VR learning environment using a scoring analysis technique,
the scoring analysis technique to output one or more values associated with a sentiment of a user of the user device, and
using the one or more values associated with the sentiment of the user to identify the one or more additional objects.

13. The method of claim 8, where performing the one or more actions comprises:
receiving feedback information from the user device,
the feedback information including at least one of:
information associated with user performance, or
information associated with user opinion of the VR learning environment,
modifying one or more objects based on the feedback information, and
providing, to the user device, additional data that causes the one or more modified objects to be deployed in the VR learning environment.

14. The method of claim 8, where performing the one or more actions comprises:
analyzing the information associated with the interactions within the VR learning environment to identify one or more user preferences,
comparing the one or more user preferences and a set of objects associated with additional VR learning environments,
identifying one or more objects associated with the additional VR learning environments based on comparing the one or more user preferences and the set of objects associated with the additional VR learning environments, and
providing, to the user device, additional data that causes the one or more objects associated with the additional VR learning environments to be deployed in the VR learning environment.

15. A non-transitory computer-readable medium storing instructions, the instructions comprising:
one or more instructions that, when executed by one or more processors, cause the one or more processors to:
receive, from a user device, a request to access a virtual reality (VR) learning environment,
the request including an identifier associated with a program that supports the VR learning environment;
identify a set of objects to use within the VR learning environment by searching a data structure using at least one of:
the identifier associated with the program that supports the VR learning environment, or
user profile information for a user associated with the user device;
provide the VR learning environment that includes the set of objects to the user device;
receive, from the user device, information associated with interactions within the VR learning environment;
identify one or more additional objects to use within the VR learning environment by using one or more natural language processing techniques to analyze the information associated with the interactions within the VR learning environment; and
provide, to the user device, data that causes the one or more additional objects to be deployed in the VR learning environment.

16. The non-transitory computer-readable medium of claim 15, where the one or more instructions, when executed by the one or more processors, further cause the one or more processors to:
receive information of a first data type that is associated with a first language;
where the one or more instructions, that cause the one or more processors to identify the one or more additional objects to use within the VR learning environment, cause the one or more processors to:
convert the information of the first data type to information of a second data type that is associated with the first language,
translate the information of the second data type that is associated with the first language to information of the second data type that is associated with a second language,
convert the information of the second data type that is associated with the second language to information of the first data type that is associated with the second language; and
where the one or more instructions, that cause the one or more processors to provide the data that causes the one or more additional objects to be deployed in the VR learning environment, cause the one or more processors to:
provide the information of the first data type that is associated with the second language to be deployed in the VR learning environment.

17. The non-transitory computer-readable medium of claim 15, where the one or more instructions, that cause the one or more processors to receive the information associated with the interactions within the VR learning environment, cause the one or more processors to:
receive information of a first data type,
the information being associated with a question presented by the user; and
where the one or more instructions, that cause the one or more processors to identify the one or more additional objects to the use within the VR learning environment, cause the one or more processors to:

convert the information of the first data type to information of a second data type, analyze the information of the second data type using the one or more natural language processing techniques, and use the analyzed information of the second data type to search a document that includes frequently asked questions of users to identify the one or more additional objects to use within the VR learning environment, the one or more additional objects being associated with responses to the question presented by the user.

18. The non-transitory computer-readable medium of claim 15, where the one or more instructions, that cause the one or more processors to identify the one or more additional objects to use within the VR learning environment, cause the one or more processors to:

analyze the information associated with the interactions within the VR learning environment using a scoring analysis technique, the scoring analysis technique to output one or more values associated with a sentiment of the user, and use the one or more values associated with the sentiment of the user to identify the one or more additional objects.

19. The non-transitory computer-readable medium of claim 15, where the one or more instructions, when executed by the one or more processors, further cause the one or more processors to:

analyze the information associated with the interactions within the VR learning environment to identify one or more user preferences;

compare the one or more user preferences and a set of objects associated with additional VR learning environments;

identify one or more objects associated with the additional VR learning environments based on comparing the one or more user preferences and the set of objects associated with the additional VR learning environments; and provide, to the user device, data that causes the one or more objects associated with the additional VR learning environments to be deployed in the VR learning environment.

20. The non-transitory computer-readable medium of claim 15, where the one or more instructions, when executed by the one or more processors, further cause the one or more processors to:

update the user profile information with one or more user preferences based on the one or more additional objects identified using the one or more natural language processing techniques;

receive a request to access another VR learning environment;

identify another set of objects to use within the other VR learning environment by searching the data structure that includes the updated user profile information; and provide the other VR learning environment that includes the other set of objects to the user device.

* * * * *